No. 871,935. PATENTED NOV. 26, 1907.
J. G. HENZEL.
ARTIFICIAL BAIT.
APPLICATION FILED APR. 8, 1907.
Fig. 1.
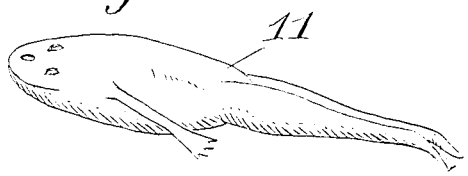
Fig. 2.
John G. Henzel
Inventor
Witnesses

UNITED STATES PATENT OFFICE.

JOHN G. HENZEL, OF CHICAGO, ILLINOIS.

ARTIFICIAL BAIT.

No. 871,935.　　　Specification of Letters Patent.　　　Patented Nov. 26, 1907.

Application filed April 8, 1907. Serial No. 367,038.

*To all whom it may concern:*

Be it known that I, JOHN G. HENZEL, citizen of the United States, residing at Chicago, in the county of Cook and State of Illinois, have invented certain new and useful Improvements in Artificial Bait, of which the following is a specification.

The invention embodies the idea of making a bait of food stuff of a kind edible by the fish, such as of flour, rice, potato and egg, or other food stuff, and this edible matter or material is inclosed in a porous fabric such as muslin, cambric, gauze or the like, and formed or shaped and colored to simulate a frog, minnow, insect, or other natural bait; the material to be baked or otherwise hardened enough to stand the strain of casting or trolling, the intent being that the fish will be attracted to the bait by its edible nature as well as by its shape or form.

The invention is illustrated in the accompanying drawings, in which

Figure 1 is a perspective view of the bait. Fig. 2 is a cross section through the bait.

The artificial bait comprises a piece of cloth or fabric as heretofore referred to, as indicated at 11, cut and stitched to form a body of the size and shape of a frog, minnow or other bait and colored to imitate the same. This is stuffed with edible material such as flour, chopped fish or meat, potato and egg, or other food stuff 12, and baked or hardened to form a bait capable of being cast or immersed in water without losing its shape and formation. The bait so formed is attached to a hook in the usual manner and will entice the fish by its edible characteristics as well as by its appearance.

I claim:

1. An artificial bait comprising a pervious casing containing edible matter.
2. An artificial bait comprising a fabric casing containing edible matter.
3. An artificial bait comprising a casing having the form and appearance of a natural bait and containing edible matter.

In testimony whereof I affix my signature, in presence of two witnesses.

JOHN G. HENZEL.

Witnesses:
　WM. J. ROBINSON,
　NELLIE FELTSKOG.